United States Patent
Cerra et al.

(10) Patent No.: US 10,989,114 B2
(45) Date of Patent: Apr. 27, 2021

(54) SYSTEMS AND METHODS FOR COOLING BLEED AIR FROM AN AIRCRAFT ENGINE

(71) Applicant: The Boeing Company, Chicago, IL (US)

(72) Inventors: David F. Cerra, Woodinville, WA (US); Paul R. Tretow, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 15/914,388

(22) Filed: Mar. 7, 2018

(65) Prior Publication Data

US 2019/0277195 A1    Sep. 12, 2019

(51) Int. Cl.

| | |
|---|---|
| *B64D 13/06* | (2006.01) |
| *F02C 6/08* | (2006.01) |
| *B64D 27/18* | (2006.01) |
| *F02K 3/06* | (2006.01) |
| *B64D 33/02* | (2006.01) |

(52) U.S. Cl.
CPC ............... *F02C 6/08* (2013.01); *B64D 13/06* (2013.01); *B64D 27/18* (2013.01); *F02K 3/06* (2013.01); *B64D 2013/0618* (2013.01); *B64D 2033/024* (2013.01); *F05D 2220/323* (2013.01); *F05D 2260/20* (2013.01); *F05D 2270/051* (2013.01); *F05D 2270/303* (2013.01)

(58) Field of Classification Search
CPC ...... B64D 2013/0618; B64D 2033/024; F05D 2270/303
See application file for complete search history.

(56) References Cited

U.S. PATENT DOCUMENTS

| | | | |
|---|---|---|---|
| 5,729,969 A | * | 3/1998 | Porte ........................ F02C 6/08 60/226.1 |
| 8,024,935 B2 | | 9/2011 | Hoover et al. |

(Continued)

FOREIGN PATENT DOCUMENTS

| | | |
|---|---|---|
| EP | 0 469 825 | 2/1992 |
| EP | 2 492 199 | 8/2012 |

(Continued)

OTHER PUBLICATIONS

Extended European Search Report prepared by the European Patent Office in application No. EP 18 21 4647.2 dated Jul. 4, 2019.

*Primary Examiner* — Brian M O'Hara
(74) *Attorney, Agent, or Firm* — McDonnell Boehnen Hulbert & Berghoff LLP (57) ABSTRACT

Systems and methods for cooling bleed air from an aircraft engine are described. An example system includes a housing to bifurcate airflow exiting a fan of an engine fan system, a pre-cooler assembly disposed within the housing to remove heat from the bleed air, and an inlet duct within the housing to direct the airflow to the pre-cooler assembly. The example system also includes at least one diverter duct within the housing and coupled to the inlet duct to divert the airflow around the pre-cooler assembly. The at least one diverter duct includes an exit directing the airflow into a fan duct of the engine fan system. The example system also includes at least one valve to control an amount of airflow through the inlet duct and an amount of airflow through the at least one diverter duct.

20 Claims, 6 Drawing Sheets

(56) References Cited

U.S. PATENT DOCUMENTS

| | | |
|---|---|---|
| 9,611,050 B2 | 4/2017 | Tretow et al. |
| 9,803,546 B2 | 10/2017 | Willie et al. |
| 9,810,147 B2 | 11/2017 | Tretow et al. |
| 9,828,084 B2 | 11/2017 | Golshany et al. |
| 9,835,093 B2 | 12/2017 | Golshany et al. |
| 2009/0007567 A1* | 1/2009 | Porte .................. F02K 3/06 60/785 |
| 2013/0020047 A1 | 1/2013 | Army, Jr. et al. |
| 2015/0031276 A1 | 1/2015 | Tretow et al. |
| 2015/0078888 A1 | 3/2015 | Golshany et al. |
| 2015/0113999 A1 | 4/2015 | Tretow et al. |
| 2015/0114481 A1 | 4/2015 | Willie et al. |
| 2015/0267644 A1 | 9/2015 | Cerra et al. |
| 2015/0275758 A1 | 10/2015 | Foutch et al. |
| 2016/0061115 A1 | 3/2016 | Cerra et al. |
| 2016/0084165 A1 | 3/2016 | Packard et al. |
| 2016/0325821 A1 | 11/2016 | Golshany et al. |
| 2017/0088275 A1 | 3/2017 | Willie et al. |
| 2017/0190439 A1 | 7/2017 | Tretow et al. |
| 2017/0275012 A1 | 9/2017 | Tretow et al. |

FOREIGN PATENT DOCUMENTS

| | | | |
|---|---|---|---|
| EP | 2 944 767 | 11/2015 | |
| EP | 2944767 A1 * | 11/2015 | ............. F02K 3/115 |

\* cited by examiner

SYSTEMS AND METHODS FOR COOLING BLEED AIR FROM AN AIRCRAFT ENGINE

FIELD

The present disclosure relates generally to systems and methods for cooling bleed air from an aircraft engine and, more particularly, to systems and methods for directing airflow to and/or around a pre-cooler assembly.

BACKGROUND

In an aircraft engine, air is drawn into a main inlet of the engine by a fan. The fan pressurizes the flow of air and the air flows from the fan in two portions. A first portion of the air flows through the core of the engine and a second portion of the air flows through a fan duct that surrounds the core of the engine.

In certain situations, air may be directed or bled from the core of the engine to supply an environmental control system (ECS), an anti-icing system, some other type of system of the aircraft, or a combination thereof. This air that is bled from the core of the engine is commonly referred to as "bleed air." The ECS may supply air to various areas and systems within the aircraft such as, for instance, the cabin of an aircraft. In some cases, the bleed air may be too hot for use in the cabin, in other lower temperature areas of the aircraft, or in other types of areas. Consequently, the bleed air is typically cooled before being sent to the ECS through the wing of an aircraft. A pre-cooler is typically used to cool the bleed air. A pre-cooler (also referred to herein as a pre-cooler assembly) is a device or system that includes, for example, a heat exchanger to cool the bleed air prior to the bleed air being sent to the ECS.

Currently available pre-coolers typically use air flowing through the fan duct around the core of the engine to cool the bleed air. For example, a pre-cooler inlet located inside the nacelle of the engine may be used to direct a portion of the air flowing from the fan of the engine to the pre-cooler. A duct connects the pre-cooler inlet to the pre-cooler. Air that enters the pre-cooler inlet is slowed down, or diffused, through the duct prior to being fed into the pre-cooler. A heat exchanger in the pre-cooler then uses the diffused air to cool the bleed air.

The conventional approaches for cooling bleed air from an aircraft engine, however, have drawbacks. For instance, during certain flight conditions, some or all of the bleed air may not need to be cooled, and thus flow to the pre-cooler may be blocked or reduced. However, when the flow to the pre-cooler is blocked or reduced, backpressure tends to build between a pre-cooler inlet valve and the engine fan system. Further, this backpressure may cause static pressure distortion (i.e., variation in static pressure circumferentially around the engine). This backpressure and static pressure distortion can significantly impact performance of the engine fan system. In particular, the backpressure and static pressure distortion may degrade performance and efficiency of the engine fan system, thereby resulting in reduced exhaust pressure.

In view of the foregoing, there is a need for improved systems and methods for cooling bleed air from an aircraft engine. Particularly, there is a need for systems and methods for cooling bleed air from an aircraft engine that reduce or eliminate backpressure between the pre-cooler inlet valve and the engine fan system. Further, there is a need for systems and methods for cooling bleed air from an aircraft engine that reduce or eliminate static pressure distortion.

SUMMARY

In one example, a system for cooling bleed air from an aircraft engine is described. The system comprises a housing to bifurcate airflow exiting a fan of an engine fan system, a pre-cooler assembly disposed within the housing to remove heat from the bleed air, and an inlet duct within the housing to direct the airflow to the pre-cooler assembly. The system further comprises at least one diverter duct within the housing and coupled to the inlet duct to divert the airflow around the pre-cooler assembly, wherein the at least one diverter duct comprises an exit directing the airflow into a fan duct of the engine fan system. The system also comprises at least one valve to control an amount of airflow through the inlet duct and an amount of airflow through the at least one diverter duct.

Within examples, the at least one diverter duct comprises a first diverter duct and the at least one valve comprises a first valve. Within examples, the system further comprises an actuator to move a door of the first valve between (i) a first position for allowing airflow through the inlet duct to the pre-cooler assembly and (ii) a second position for preventing airflow through the inlet duct and allowing airflow through the first diverter duct.

Within examples, the door is hingedly connected to the housing within the inlet duct. Within examples, the door is positioned in a wall of the inlet duct. Within examples, the actuator is configured to move the door to a plurality of positions between the first and second positions, so that, for each position of the plurality of positions, a portion of the airflow flows through the inlet duct to the pre-cooler assembly and a remainder of the airflow is diverted through the first diverter duct. Within examples, the actuator is configured to select a position of the door based on a hot bleed temperature of air exiting the pre-cooler assembly.

Within examples, the exit directing the airflow into the fan duct of the engine fan system is positioned at a location between an opening of the inlet duct and a trailing edge of a nacelle surrounding the engine fan system.

Within examples, the pre-cooler assembly comprises a ram pre-cooler assembly.

Within examples, the housing defines a central axis, wherein the inlet duct is defined along the central axis, and wherein the at least one diverter duct is positioned at an angle relative to the central axis.

Within examples, the housing is positioned aft of the fan. Within examples, the housing is positioned below a strut attached to an aircraft wing and above a core of the aircraft engine.

In another example, a system for cooling bleed air from an aircraft engine is described. The system comprises a housing to bifurcate airflow exiting a fan of an engine fan system, a pre-cooler assembly disposed within the housing to remove heat from the bleed air, and an inlet duct within the housing to direct the airflow to the pre-cooler assembly. The system further comprises a diverter duct within the housing to divert the airflow around the pre-cooler assembly and into a fan duct of the engine fan system, a door coupled to the housing and positioned in a wall of the inlet duct, and an actuator to move the door between (i) a first position for allowing airflow through the inlet duct to the pre-cooler assembly and (ii) a second position for allowing airflow through the diverter duct.

Within examples, the door is hingedly connected to the housing.

Within examples, the diverter duct comprises an exit directing the airflow into the fan duct of the engine fan system, wherein the exit is positioned at a location between an opening of the inlet duct and a trailing edge of a nacelle surrounding the engine fan system.

Within examples, the pre-cooler assembly comprises a ram pre-cooler assembly.

Within examples, the housing defines a central axis, wherein the inlet duct is defined along the central axis, and wherein the diverter duct is positioned at an angle relative to the central axis.

Various examples of the system(s) described herein may include any of the components, features, and functionalities of any of the other examples of the system(s) described herein in any combination.

In another example, a method in an aircraft having an engine fan system and a pre-cooler assembly is described. The method includes blocking airflow to the pre-cooler assembly. The method further includes diverting the airflow around the pre-cooler assembly, so as to reduce backpressure on the engine fan system when blocking the airflow to the pre-cooler assembly. The method further includes directing the diverted airflow into a fan duct of the engine fan system, so as to recover thrust from the diverted airflow.

Within examples, directing the diverted airflow into a fan duct of the engine fan system comprises directing the airflow back into the fan duct at a location between an opening of an inlet duct of the pre-cooler assembly and a trailing edge of a nacelle surrounding the engine fan system.

Within examples, (i) blocking airflow to the pre-cooler assembly and (ii) diverting the airflow around the pre-cooler assembly comprises moving a door from a first position for allowing the airflow through an inlet duct to the pre-cooler assembly to a second position for diverting the airflow through a diverter duct.

Within examples, blocking airflow to the pre-cooler assembly takes place when a hot bleed temperature of air exiting the pre-cooler assembly is below a set threshold temperature.

Various examples of the method(s) described herein may include any of the components, features, and functionalities of any of the other examples of the method(s) described herein in any combination.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

As mentioned above, current systems and methods for cooling bleed air from an aircraft engine have drawbacks including performance-degrading backpressure that tends to build between the pre-cooler inlet valve and the engine fan system when the inlet valve blocks or slows the flow to the pre-cooler. The methods and systems in accordance with the present disclosure beneficially provide improved methods and systems for cooling bleed air from an aircraft engine. In one example, a system is described that includes a housing to bifurcate airflow exiting a fan of an engine fan system, a pre-cooler assembly disposed within the housing to remove heat from the bleed air, and an inlet duct within the housing to direct the airflow to the pre-cooler assembly. The system also includes at least one diverter duct within the housing and coupled to the inlet duct to divert the airflow around the pre-cooler assembly, wherein the at least one diverter duct comprises an exit directing the airflow into a fan duct of the engine fan system. The system further includes at least one valve to control an amount of airflow through the inlet duct and an amount of airflow through the at least one diverter duct. The disclosed system beneficially reduces or eliminates backpressure between the inlet valve and the engine fan system when the inlet valve blocks or slows the flow to the pre-cooler.

Figure 1:
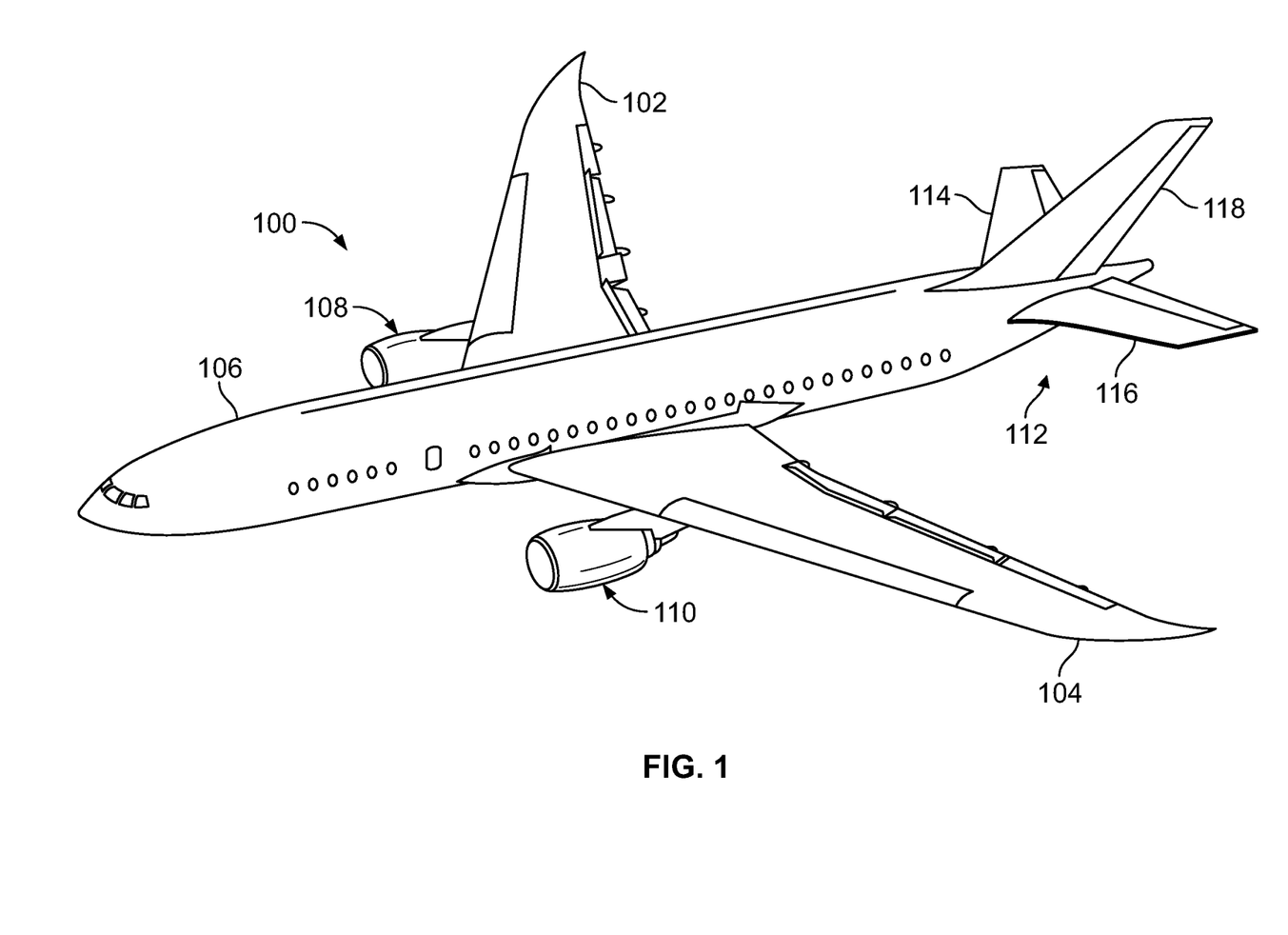
FIG. 1 illustrates a perspective view of an aircraft, according to an example implementation.

Referring now to FIG. 1, an aircraft 100 is illustrated, according to an example implementation. In this example, aircraft 100 has wing 102 and wing 104 attached to body 106. Aircraft 100 includes engine system 108 attached to wing 102 and engine system 110 attached to wing 104. Body 106 includes tail section 112. Horizontal stabilizer 114, horizontal stabilizer 116, and vertical stabilizer 118 are attached to tail section 112. Engine system 108 and engine system 110 may each have a system for cooling bleed air (not shown in this view). Engine system 110 is described in greater detail below. It should be understood that the details described with reference to engine system 110 may similarly apply to engine system 108.

Figure 2:
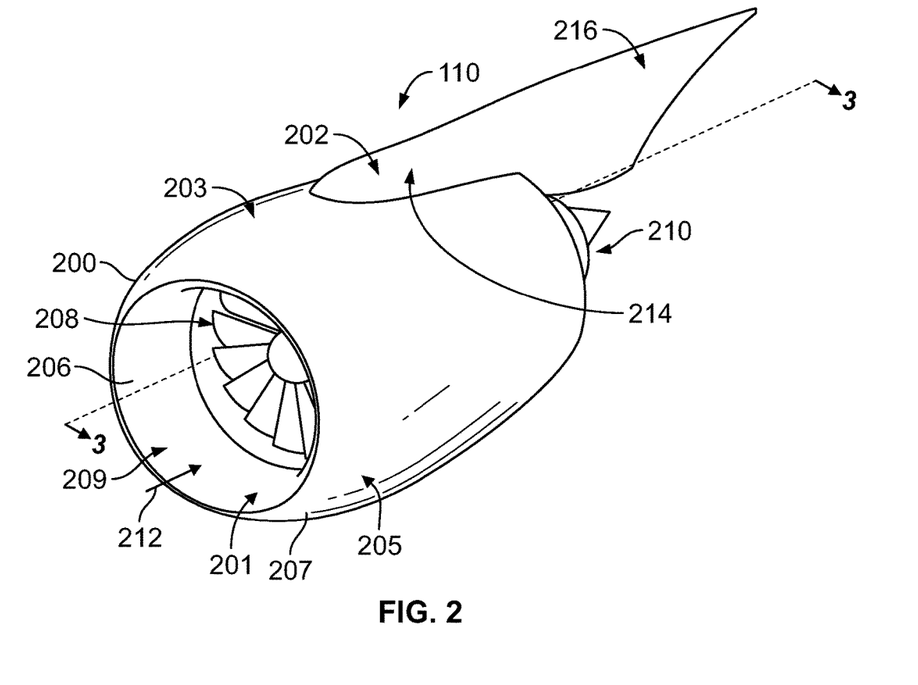
FIG. 2 illustrates an example engine system of the aircraft of FIG. 1, according to an example implementation.

With reference now to FIG. 2, a close-up, perspective view of engine system 110 is illustrated. Engine system 110 includes nacelle 200. Nacelle 200 is a housing for the various components of engine system 110. As depicted, nacelle 200 comprises first section 206 located at first side 203 of engine system 110 and second section 207 located at second side 205 of engine system 110. Nacelle 200 of engine system 110 is associated with wing 104 of aircraft 100 from FIG. 1 through structure 202.

In this illustrative example, structure 202 is located at an aft end of engine system 110 with respect to aircraft 100 in FIG. 1. Further, engine inlet 209 is located at the forward end of engine system 110. Structure 202 includes one or more different components to mount engine system 110 to wing 104 of aircraft 100. Within examples, structure 202 includes strut 214 and pylon 216.

Together, structure 202, nacelle 200, and the components within nacelle 200 may form engine system 110. In this illustrative example, nacelle 200 and the components within nacelle 200 may be referred to as an "aircraft engine." Within other examples, nacelle 200, the components within nacelle 200, and structure 202 may all be referred to as an "aircraft engine" rather than engine system 110.

As used herein, when one component is "associated" with another component, the association is a physical association in the depicted examples. For example, a first component, such as nacelle 200, may be considered to be associated with a second component, such as wing 104 in FIG. 1, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both.

Figure 3:
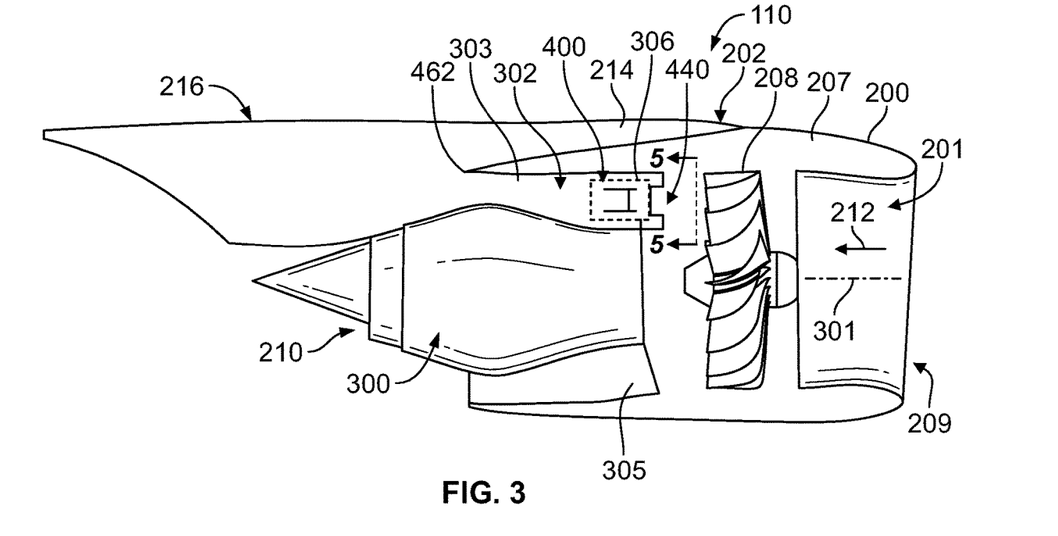
FIG. 3 illustrates a side view of the engine system of FIG. 2, with a first part of a nacelle hidden, according to an example implementation.

FIG. 3 illustrates a side view of engine system 110 from FIGS. 1-2, with first section 206 of nacelle 200 hidden from view. In particular, engine system 110 is seen from the view taken with respect to lines 3-3 in FIG. 2 with first section 206 of nacelle 200 hidden such that the interior of engine system 110 may be more clearly seen in this view. With reference to both FIGS. 2 and 3, engine system 110 includes an engine fan system 201 having fan 208, engine inlet 209, and fan duct 302 (see FIG. 3). Engine system 110 also includes exhaust system 210. Within examples, fan 208 is a turbofan. During operation, air flows into engine inlet 209 in direction 212 towards fan 208. Fan 208 uses this air to create airflow through engine system 110, so as to provide thrust for aircraft 100.

With reference to FIG. 3, a portion of this airflow may be directed into the engine core 300 of engine system 110, while another portion of this airflow may be directed through fan duct 302 of the engine fan system 201. One or more aerodynamic surfaces within engine system 110 may separate the portion of the fan duct on first side 203 of engine system 110 from the fan duct on second side 205 of engine system 110.

Engine core 300 receives a portion of the air that flows from fan 208. Fan 208 may rotate about center axis 301 of fan 208. Rotation of fan 208 may create airflow towards engine core 300. The air flowing from fan 208 may be referred to as "fan air." The total pressure of this fan air may vary radially with respect to center axis 301. For example, the total pressure of the fan air may increase radially outwards from center axis 301 and then decrease. Fan air flowing from fan 208 may have a maximum total pressure between center axis 301 and an outer edge of fan 208.

Fan duct 302 is formed between nacelle 200 and engine core 300 and is divided into two portions. In particular, a first portion of fan duct 302 is formed around engine core 300 between first surface 303 and second surface 305. First surface 303 and second surface 305 may be aerodynamic surfaces associated with nacelle 200.

Engine system 110 also includes a system 400 for cooling bleed air. For simplicity, system 400 is represented by a box in FIG. 3 and thus the details of system 400 are not illustrated in FIG. 3. Instead, example details of system 400 are illustrated in FIGS. 4A-6B.

The system 400 is configured cool bleed air from engine system 110. More particularly, system 400 is configured to send a portion of fan air to a pre-cooler in order to cool air that is bled from engine core 300. Air may be bled from engine core 300 for use in supplying air to one or more systems of aircraft 100 from FIG. 1. These systems may include, for example, at least one of an environmental control system (ECS), an anti-icing system, or some other types of system. Fan air that enters engine core 300 may be compressed by a compressor to increase air pressure within the compressor. This compressed air may be injected with and burned with fuel in a combustor. A portion of this compressed air is sent to the pre-cooler to be cooled prior to being sent to different systems (e.g., an environmental control system) in aircraft 100 in FIG. 1. As used herein, this portion of the compressed air is referred to as "bleed air."

Figure 4A:
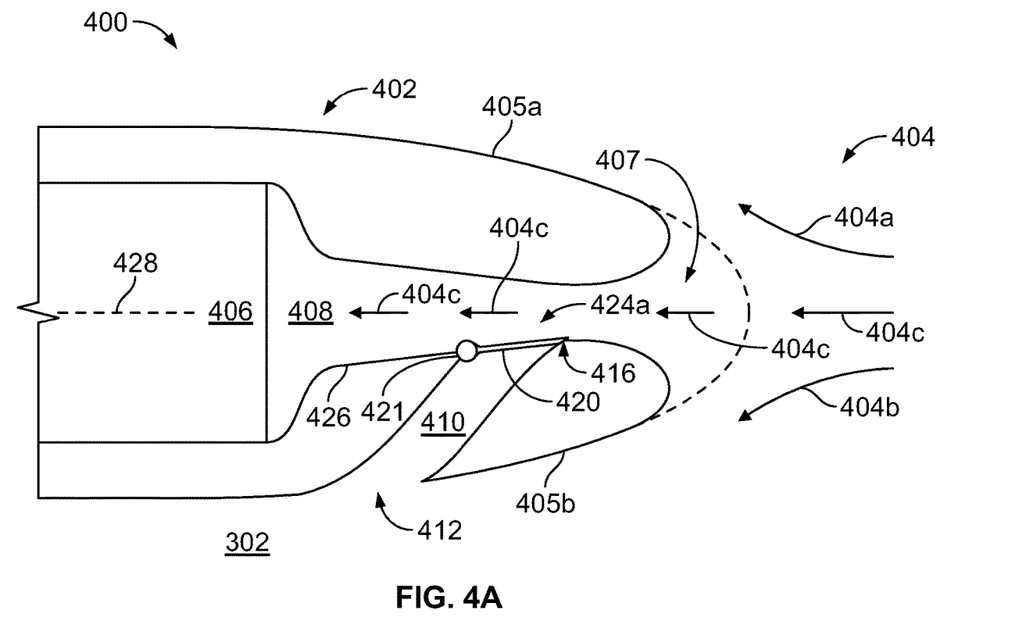
FIG. 4A illustrates a top view of a system for cooling bleed air, where a diverter duct is blocked by a valve, according to an example implementation.
Figure 4B:
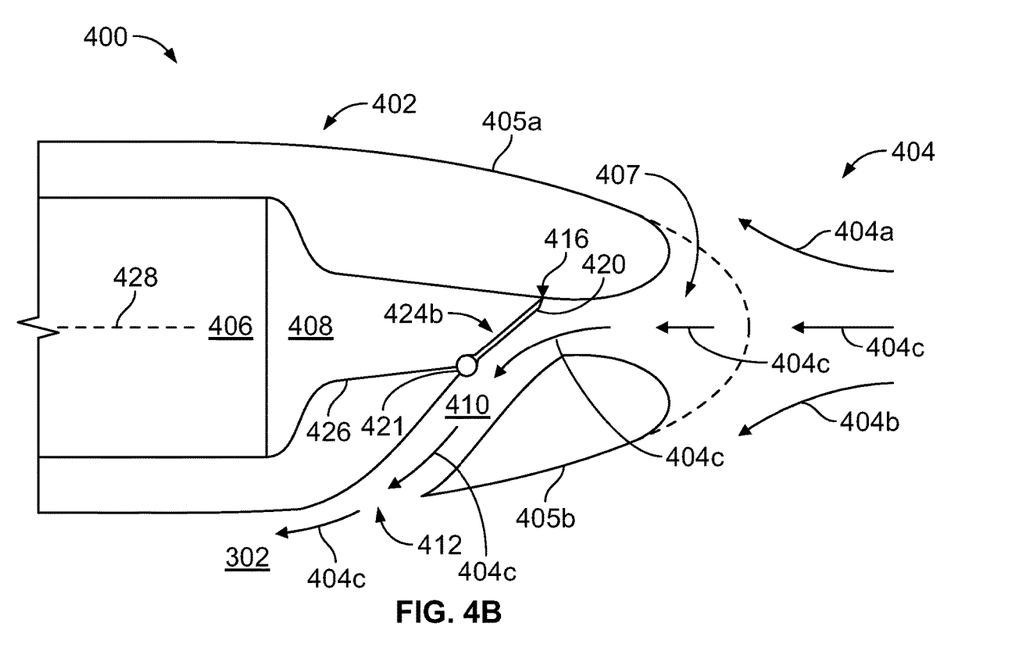
FIG. 4B illustrates a top view of a system for cooling bleed air where an inlet duct is blocked by a valve, according to an example implementation.
Figure 5:
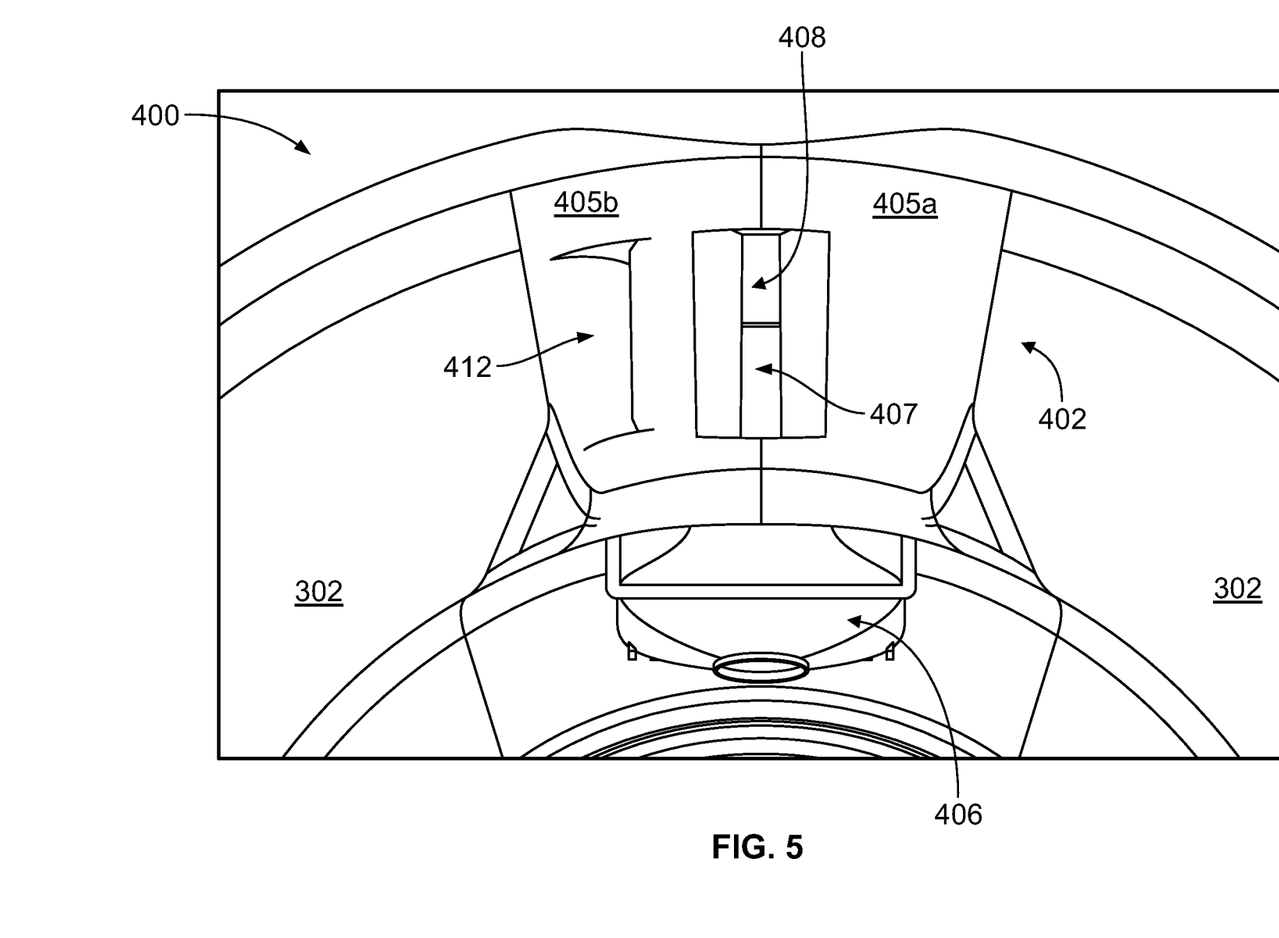
FIG. 5 illustrates a front view of a system for cooling bleed air, according to an example implementation.
Figure 6A:
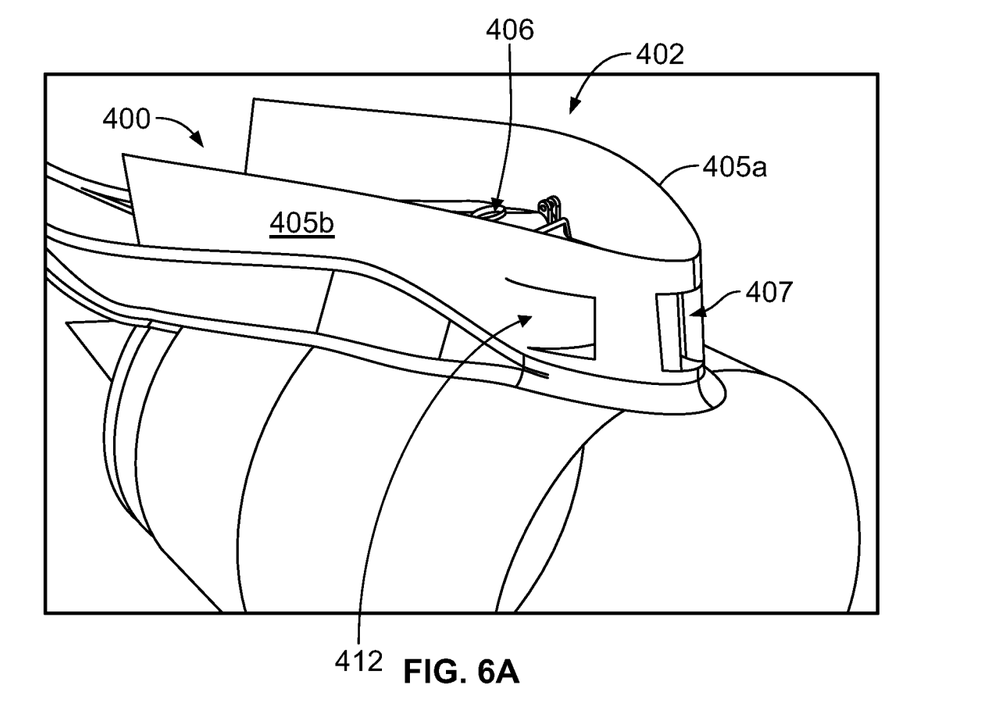
FIG. 6A illustrates a perspective view of a system for cooling bleed air, according to an example implementation.
Figure 6B:
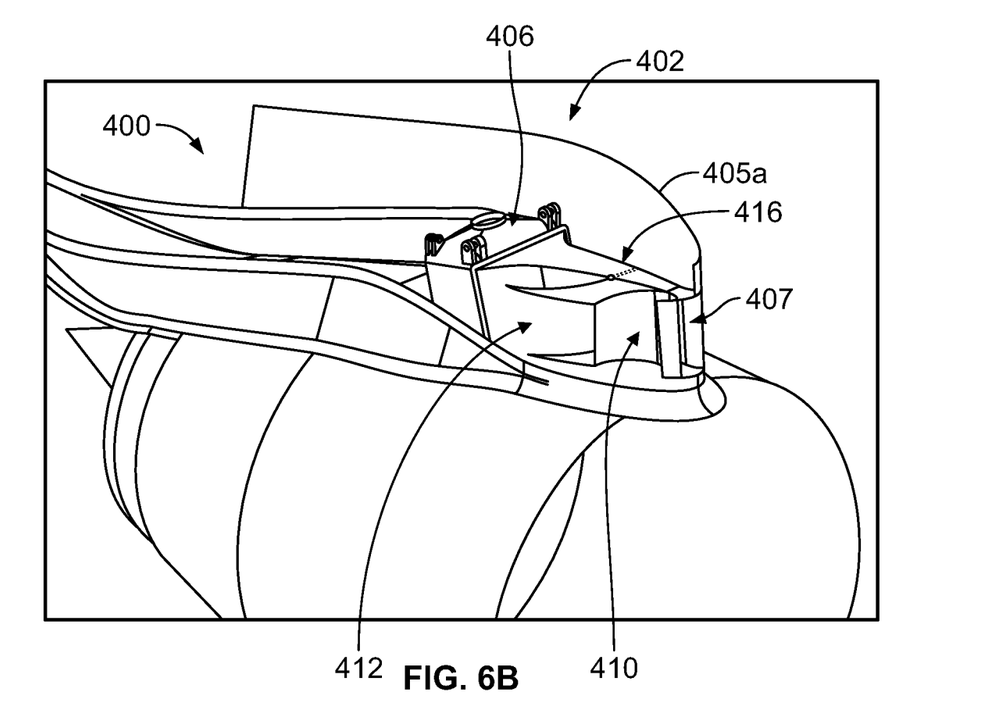
FIG. 6B illustrates a perspective view of a system for cooling bleed air, with a bifurcation surface of a housing hidden from view, according to an example implementation.

Referring now to FIGS. 4A-6B, the system 400 for cooling bleed air from engine system 110 is described in greater detail. FIGS. 4A-B are illustrations of top views of system 400. Further, FIG. 5 is a front view of system 400 that is taken with respect to lines 5-5 in FIG. 3. Still further, FIGS. 6A-B are perspective views of system 400.

System 400 includes a housing 402 to bifurcate airflow 404 exiting fan 208 of engine fan system 201 (see FIG. 3). The housing 402 includes first bifurcation surface 405a and second bifurcation surface 405b that serve to bifurcate airflow 404. As shown in FIGS. 4A-B, a first portion (i.e., airflow 404a) of airflow 404 travels around first bifurcation surface 405a, a second portion (i.e., airflow 404b) travels around second bifurcation surface 405b, and a third portion (i.e., airflow 404c) travels into an opening 407. Within examples, airflow 404 is pressurized air that has exited fan 208 and traveled through guide vanes (commonly referred to as "fan exit guide vanes" or "outlet guide vanes").

The housing 402 may be positioned at any suitable location for receiving airflow 404. In general, the housing 402 is positioned aft of the fan 208. Within examples, the housing 402 is positioned below strut 214 and above engine core 300 (see FIG. 3). Within other examples, the housing 402 is positioned in strut 214 or between the strut 214 and nacelle 200 surrounding the engine fan system 201.

The housing 402 may be made from any suitable material. Within examples, the housing 402 comprises metal (e.g., aluminum, titanium, etc.) and/or composite (e.g., composite panel with laminated honeycomb core). Within examples, the housing 402 also includes insulating material, which may help to protect components of system 400 from damage due to high temperatures within the engine system 110.

System 400 also includes a pre-cooler assembly 406 disposed within the housing 402 to remove heat from the bleed air. The pre-cooler assembly 406 includes one or more heat exchangers to cool the bleed air. Within examples, the heat exchanger(s) comprise an air-to-air heat exchanger. In this illustrated example, the pre-cooler assembly 406 is a ram pre-cooler assembly having a ram inlet. Within other examples, the pre-cooler assembly 406 is a flush mounted pre-cooler assembly having a flush inlet. In examples where the pre-cooler assembly 406 has a flush inlet, the system 400 may help to reduce or eliminate pressure oscillations.

The system 400 also includes an inlet duct 408 within the housing 402 to direct the airflow 404 to the pre-cooler assembly 406. In particular, the inlet duct 408 directs airflow 404*c* that enters opening 407 to the pre-cooler assembly 406.

The system 400 further includes at least one diverter duct 410 within the housing 402 and coupled to the inlet duct 408 to divert the airflow 404 around the pre-cooler assembly 406. In particular, the at least one diverter duct 410 diverts airflow 404*c* around the pre-cooler assembly 406. The at least one diverter duct 410 comprises an exit 412 to direct the airflow 404*c* into fan duct 302 (see FIGS. 4A-B and 5).

As shown in FIGS. 4A-B and 6B, the system 400 also includes at least one valve 416 to control an amount of airflow 404*c* through the inlet duct 408 and an amount of airflow 404*c* through the at least one diverter duct 410. The at least one valve 416 may be referred to as a fan air modulating valve (FAMV). Any suitable valve may be used to control the amount of airflow 404*c* through the inlet duct 408 and an amount of airflow 404*c* through the at least one diverter duct 410. Within examples, the valve 416 comprises a flapper valve, a butterfly valve, a door valve, a check valve, a gate valve, a diaphragm valve, a knife valve, or a plug valve. Other types of valves are possible as well. Furthermore, the at least one valve 416 may be made from any suitable materials. Within examples, the at least one valve comprises metallic, composite, or rubber materials.

Figure 7:
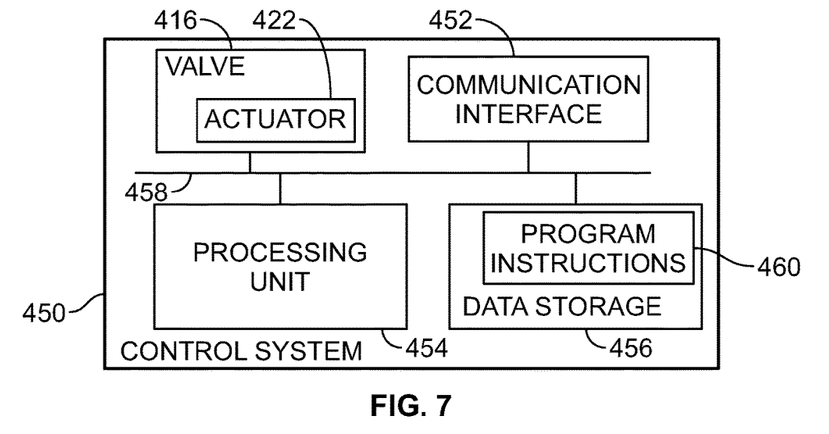
FIG. 7 illustrates a simplified block diagram of a processor-based control system operable in the system for cooling bleed air, according to an example implementation.

With reference to FIGS. 4A-B and 7, the at least one valve 416 comprises a door 420 and an actuator 422 (see FIG. 7) to move the door 420 between (i) a first position 424*a* for allowing airflow through the inlet duct 408 to the pre-cooler assembly 406 and (ii) a second position 424*b* for preventing airflow through the inlet duct 408 and allowing airflow through the diverter duct 410. The door 420 is hingedly connected to the housing 402 within the inlet duct 408 at point 421. Further, in this example, the door 420 is positioned in a wall 426 of the inlet duct. By being positioned in the wall 426, the door 420 is flush or substantially flush with the wall 426 when the door is in the first position 424*a*. This flush arrangement allows for efficient flow through the inlet duct 408.

This disclosed arrangement of at least one diverter duct 410 within the housing 402 to divert the airflow around the pre-cooler assembly 406 provides for eliminating or reducing backpressure compared to known systems for cooling bleed air. Conventional systems include an inlet valve to control flow to the pre-cooler but do not include a diverter duct to divert the air around the pre-cooler. A drawback of these conventional systems is that, when the inlet valve blocks or slows the flow to the pre-cooler, backpressure tends to build between the inlet valve and the engine fan system. This backpressure may cause static pressure distortion (i.e., variation in static pressure circumferentially around the engine). Conventional ram pre-cooler assemblies in particular suffer from high backpressure. For instance, in conventional ram pre-cooler assemblies, backpressure may build at an area between the inlet to the pre-cooler and the fan (e.g., an area that would correspond to area 440 in FIG. 3, which is the area between the system 400 and fan 208). This backpressure and static pressure distortion can degrade performance of the fan system, thereby resulting in reduced exhaust pressure. The disclosed arrangement of the at least one diverter duct 410 helps to reduce or eliminate such backpressure and static pressure distortion, thereby avoiding reducing exhaust pressure.

Within examples, the actuator 422 is configured to move the door 420 to a plurality of positions between the first and second positions, so that, for each position of the plurality of positions, a portion of the airflow 404*c* flows through the inlet duct 408 to the pre-cooler assembly 406 and a remainder of the airflow 404*c* is diverted through the at least one diverter duct 410. The actuator 422 may be any suitable actuator to control the position of the door 420. Within examples, the actuator 422 comprises a hydraulic actuator, pneumatic actuator, electric actuator, thermal actuator, and/or a magnetic actuator. By being movable between the plurality of positions, the system 400 allows a desired amount of airflow 404*c* to flow to the pre-cooler assembly 406 and a desired amount to be diverted around the pre-cooler assembly 406.

Within examples, the actuator 422 is configured to select a position of the door 420 based on a hot bleed temperature of air exiting the pre-cooler assembly 406. In practice, the hot bleed air temperature of air exiting the pre-cooler assembly 406 should remain below structural and operational temperature limits. Further, the hot bleed temperature of air exiting the pre-cooler assembly 406 may vary based on operating conditions of the aircraft engine. In practice, different flight conditions may call for different amounts of airflow to flow to the pre-cooler assembly 406 and airflow around the pre-cooler assembly 406. For instance, during cruise conditions the pre-cooler assembly 406 may be turned off and the door 420 may be positioned in the second position 424*b*, so that all or substantially all of the airflow 404*c* flows through the at least one diverter duct 410 around the pre-cooler assembly 406. In other examples, such as during icing conditions or a failure condition (e.g., an engine failure or an inoperative valve), the door 420 may be positioned in the first position 424*a* so that all or substantially all of the airflow 404*c* flows through the inlet duct 408 to the pre-cooler assembly 406. In yet other examples, it may be desirable to allow a given percentage (e.g., between about 5% to about 95%) of airflow 404*c* to reach the pre-cooler assembly 406, while diverting the remainder around the pre-cooler assembly 406. Within examples, the desired percentage of airflow 404*c* to be directed to the pre-cooler assembly 406 versus the desired percentage of airflow 404*c* to be diverted may depend on various factors, including but not limited to flight phase, atmospheric conditions, wing and engine anti-icing, cabin pressure, and/or occupancy load. Within examples, during a climbing phase or a descending flight phase, a given percentage (e.g., between about 5% to about 95%) of airflow 404*c* is allowed to reach the pre-cooler assembly 406, while the remainder is diverted around the pre-cooler assembly 406.

Within examples, the system 400 comprises a processor-based control system configured to control the actuator 422 and adjust the position of the door 420. FIG. 7 illustrates a simplified block diagram of processor-based control system 450 showing some of the physical components that such a processor-based control system may include. As shown in FIG. 7, the processor-based control system 450 includes valve 416 having actuator 422, a communications interface 452, a processing unit 454, and data storage 456, all of which may be communicatively linked together by a system bus, network, or other connection mechanism 458.

Within this example arrangement, the communication interface 452 functions to provide for communication with various other aircraft elements (e.g., an ECS) and may thus take various forms, allowing for wired and/or wireless communication for instance. Processing unit 454 comprises one or more general purpose processors (e.g., microprocessors) and/or one or more special purpose processors (e.g., application specific integrated circuits) and may be integrated in whole or in part with the communication interface. And data storage 456 comprises one or more volatile and/or non-volatile storage components, such as optical, magnetic, or flash memory and may be integrated in whole or in part with the processing unit. As shown, by way of example, data storage 456 includes non-transitory computer readable medium and stores program instructions 460, which are executable by processing unit 454 to carry out various functions described herein. In an example embodiment, program instructions 460 are executable to perform functions comprising, for example, (i) selecting a position of the door 420 based on operating conditions of the aircraft engine and (ii) causing the actuator 422 to move the door 420 to the selected position.

Returning to FIGS. 4A-6B, when all or a portion of the airflow 404c is diverted around the pre-cooler assembly 406, the diverted air flows out exit 412 into the fan duct 302. This exit 412 re-introduces the diverted air back into the bypass stream flowing around the engine core 300. The exit 412 may be positioned at any suitable location downstream of the fan 208 that allows the air to be re-introduced into the fan air. Within examples, the exit 412 is positioned at a location between the opening 407 of the inlet duct 408 and a trailing edge 462 of nacelle 200 (see FIG. 3). Directing the diverted air into the fan duct 302 allows the engine system 110 to recover thrust from the diverted air. In particular, by re-introducing the diverted air into fan duct 302, the engine is able to use the diverted air to provide additional thrust for engine system 110. Since the diverted air has been pressurized by fan 208, the engine system 110 burned fuel to create that diverted, pressurized air. This re-introduction of the diverted air into the fan duct 302 to recover the thrust from the diverted air helps the engine system 110 to improve the fuel efficiency of the engine system.

Although in the example of FIGS. 4A-6B the exit 412 directs the diverted air to the fan duct 302, in other examples the exit 412 may be positioned to direct the diverted air to other locations. For instance, within other examples, exit 412 directs the air into the engine core 300. Within other examples, exit 412 directs the diverted air to a location within strut 214 or pylon 216.

In the illustrated example, the housing defines a central axis 428, and the inlet duct 408 is defined along the central axis 428 (see FIGS. 4A-B). Within other examples, the inlet duct 408 is off-centered relative to the central axis 428. Further, in this illustrated example, the at least one diverter duct 410 is positioned at about a 45 degree angle relative to the central axis 428. However, other angles are possible. For instance, within other examples, the at least one diverter duct 410 is positioned at about 5 to about 90 degrees relative to the central axis Other angles are possible as well.

Figure 8:
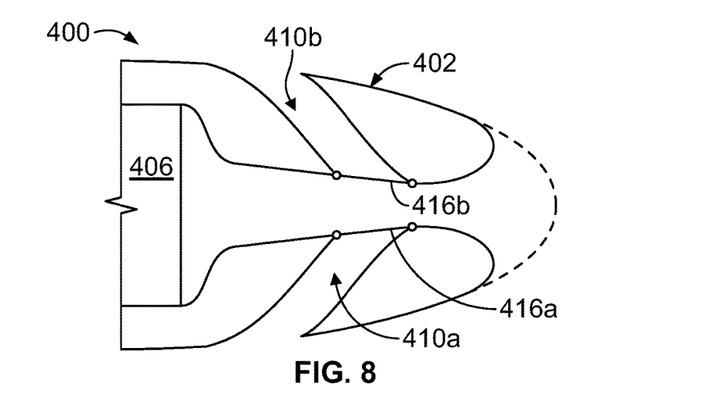
FIG. 8 illustrates a top view of a system for cooling bleed air, according to an example implementation.

Furthermore, although in the example of FIGS. 4A-6B the at least one diverter duct 410 consists of a single diverter duct, in other examples the at least one diverter duct 410 includes a plurality of diverter ducts. For instance, FIG. 8 illustrates the housing 402 including a first diverter duct 410a and a second diverter duct 410b. Further, the at least one valve 416 includes a first valve 416a to control flow through diverter duct 410a and a second valve 416b to control flow through second diverter duct 410b. Within other examples, three or more diverter ducts are possible.

Figure 9:
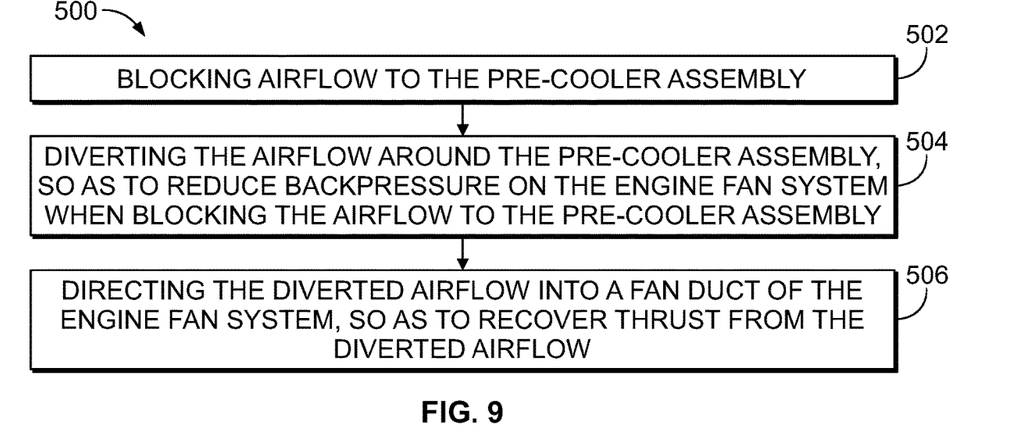
FIG. 9 shows a flowchart of an example method in an aircraft having an engine fan system and a pre-cooler assembly, according to an example implementation.

FIG. 9 shows a flowchart of an example method 500, according to an example implementation. Method 500 shown in FIG. 9 presents an example of a method that could be used in an aircraft having an engine fan system and a pre-cooler assembly, such as engine fan system 110 and pre-cooler assembly 406, for example. In some instances, components of the disclosed systems may be configured to perform the functions such that the components are actually configured and structured to enable such performance. In other examples, components of the disclosed systems may be arranged to be adapted to, capable of, or suited for performing the functions, such as when operated in a specific manner. Method 500 may include one or more operations, functions, or actions as illustrated by one or more of blocks 502-506. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes blocking airflow 404 to the pre-cooler assembly 406. Within examples, blocking airflow 404 to the pre-cooler assembly 406 takes place when a hot bleed temperature exiting the pre-cooler assembly is below a set threshold temperature. Within examples, the set threshold temperature is a temperature between about 350° F. and about 450° F. However, other threshold temperatures are possible as well.

Within examples, airflow 404 is blocked or substantially blocked during conditions when bleed air demand to the cabin is low or wing and engine anti-ice is not required. Within examples, a cruise flight phase is a situation where airflow 404 is blocked or substantially blocked. Within examples, pre-cooler assembly 406 is a ram pre-cooler assembly having a ram inlet or a pre-cooler assembly having a flush inlet.

At block 504, the method includes diverting the airflow 404 around the pre-cooler assembly 406, so as to reduce backpressure on the engine fan system 201 when blocking the airflow 404 to the pre-cooler assembly 406.

Within examples, (i) blocking airflow 404 to the pre-cooler assembly 406 and (ii) diverting the airflow 404 around the pre-cooler assembly 406 comprises moving door 420 from a first position for allowing the airflow through inlet duct 408 to the pre-cooler assembly 406 to a second position for diverting the airflow through diverter duct 410.

At block 506, the method includes directing the diverted airflow into a fan duct 302 of the engine fan system 201, so as to recover thrust from the diverted airflow.

Within examples, directing the diverted airflow into fan duct 302 comprises directing the airflow back into the fan duct 302 at a location between opening 407 of the inlet duct 408 of the pre-cooler assembly 406 and a trailing edge 462 of nacelle 200 surrounding the engine fan system 201.

Example systems and method described herein provide improved systems and methods for cooling bleed air from an aircraft engine. In particular, the improved systems and methods eliminate or reduce backpressure between the inlet valve and the engine fan system. Further, in examples where the diverted air is re-introduced into the airflow downstream of the fan 208, the disclosed system takes advantage of the pressurized, diverted air and uses it to provide additional thrust for the aircraft. The disclosed systems and methods thus help to simultaneously reduce backpressure and avoid reducing exhaust pressure used for thrust.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

As used herein, the term "about" in association with a numerical value means that the value varies up or down by 5%. For example, a value of about 100 means 95 to 105 (or any value between 95 and 105).

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A system for cooling bleed air from an aircraft engine, the system comprising:
    a housing to bifurcate airflow exiting a fan of an engine fan system, wherein the housing defines a central axis and wherein the housing is positioned below a strut attached to an aircraft wing and above a core of the aircraft engine;
    a pre-cooler assembly disposed within the housing to remove heat from the bleed air;
    an inlet duct within the housing to direct the airflow to the pre-cooler assembly, wherein the inlet duct has an opening and wherein the inlet duct and the opening are defined along the central axis of the housing;
    at least one diverter duct within the housing and coupled to the inlet duct to divert the airflow around the pre-cooler assembly, wherein the at least one diverter duct comprises an exit directing the airflow into a fan duct of the engine fan system; and
    at least one valve to control an amount of airflow through the inlet duct and an amount of airflow through the at least one diverter duct.

2. The system of claim 1, wherein the at least one diverter duct comprises a first diverter duct, and wherein the at least one valve comprises a first valve, the system further comprising:
    an actuator to move a door of the first valve between (i) a first position for allowing airflow through the inlet duct to the pre-cooler assembly and (ii) a second position for preventing airflow through the inlet duct and allowing airflow through the first diverter duct.

3. The system of claim 2, wherein the door is hingedly connected to the housing within the inlet duct.

4. The system of claim 3, wherein the door is positioned in a wall of the inlet duct.

5. The system of claim 3, wherein the actuator is configured to move the door to a plurality of positions between the first and second positions, so that, for each position of the plurality of positions, a portion of the airflow flows through the inlet duct to the pre-cooler assembly and a remainder of the airflow is diverted through the first diverter duct.

6. The system of claim 5, wherein the actuator is controlled to select one of the plurality of positions of the door based on a hot bleed temperature of air exiting the pre-cooler assembly.

7. The system of claim 1, wherein the exit directing the airflow into the fan duct of the engine fan system is positioned at a location between the opening of the inlet duct and a trailing edge of a nacelle surrounding the engine fan system.

8. The system of claim 1, wherein the pre-cooler assembly comprises a ram pre-cooler assembly.

9. The system of claim 1, wherein the at least one diverter duct is positioned at an angle relative to the central axis.

10. The system of claim 1, wherein the housing is positioned aft of the fan.

11. A system for cooling bleed air from an aircraft engine, the system comprising:
    a housing to bifurcate airflow exiting a fan of an engine fan system, wherein the housing defines a central axis and wherein the housing is positioned below a strut attached to an aircraft wing and above a core of the aircraft engine;
    a pre-cooler assembly disposed within the housing to remove heat from the bleed air;
    an inlet duct within the housing to direct the airflow to the pre-cooler assembly, wherein the inlet duct has an opening and wherein the inlet duct and the opening are defined along the central axis of the housing;
    a diverter duct within the housing to divert the airflow around the pre-cooler assembly and into a fan duct of the engine fan system;

a door coupled to the housing and positioned in a wall of the inlet duct; and an actuator to move the door between (i) a first position for allowing airflow through the inlet duct to the pre-cooler assembly and (ii) a second position for allowing airflow through the diverter duct.

12. The system of claim 11, wherein the door is hingedly connected to the housing.

13. The system of claim 11, wherein the diverter duct comprises an exit directing the airflow into the fan duct of the engine fan system, wherein the exit is positioned at a location between the opening of the inlet duct and a trailing edge of a nacelle surrounding the engine fan system.

14. The system of claim 11, wherein the pre-cooler assembly comprises a ram pre-cooler assembly.

15. The system of claim 11, wherein the diverter duct is positioned at an angle relative to the central axis.

16. A method in an aircraft having an engine fan system and a pre-cooler assembly and a housing to bifurcate airflow exiting a fan of the engine fan system, the method comprising:

blocking airflow to the pre-cooler assembly, wherein the housing defines a central axis along which an inlet duct with an opening are defined through which the airflow to the pre-cooler assembly is blocked, and wherein the housing is positioned below a strut attached to an aircraft wing and above a core of an aircraft engine;

diverting the airflow around the pre-cooler assembly, so as to reduce backpressure on the engine fan system when blocking the airflow to the pre-cooler assembly; and directing the diverted airflow into a fan duct of the engine fan system, so as to recover thrust from the diverted airflow.

17. The method of claim 16, wherein directing the diverted airflow into a fan duct of the engine fan system comprises directing the airflow back into the fan duct at a location between the opening of an inlet duct of the pre-cooler assembly and a trailing edge of a nacelle surrounding the engine fan system.

18. The method of claim 16, wherein (i) blocking airflow to the pre-cooler assembly and (ii) diverting the airflow around the pre-cooler assembly comprises:

moving a door from a first position for allowing the airflow through an inlet duct to the pre-cooler assembly to a second position for diverting the airflow through a diverter duct.

19. The method of claim 16, wherein blocking airflow to the pre-cooler assembly takes place when a hot bleed temperature of air exiting the pre-cooler assembly is below a set threshold temperature.

20. The system of claim 1, wherein the housing is positioned between the strut and a nacelle surrounding the engine fan system.

* * * * *